(12) United States Patent (10) Patent No.: US 7,399,729 B2
Rocha et al. (45) Date of Patent: Jul. 15, 2008

(54) CATALYST SYSTEM FOR THE REDUCTION OF $NO_X$

(75) Inventors: Teresa Grocela Rocha, Waterford, NY (US); Jonathan Lloyd Male, Schoharie, NY (US); Jennifer Kathleen Redline, Clifton Park, NY (US); Alison Liana Palmatier, Porter Corners, NY (US); Kaidong Chen, Albany, CA (US); Dan Hancu, Clifton Park, NY (US); Grigorii Lev Soloveichik, Latham, NY (US); Eric Budesheim, Wynantskill, NY (US); Aaron Joseph Simon, Los Altos, CA (US)

(73) Assignee: General Electric Company, Niskayuna, NY (US)

( * ) Notice: Subject to any disclaimer, the term of this patent is extended or adjusted under 35 U.S.C. 154(b) by 648 days.

(21) Appl. No.: 10/743,646

(22) Filed: Dec. 22, 2003

(65) Prior Publication Data

US 2005/0137083 A1    Jun. 23, 2005

(51) Int. Cl.
*B01J 23/40* (2006.01)
(52) U.S. Cl. ...................................................... 502/327
(58) Field of Classification Search .............. 423/239.1; 502/327, 332, 346, 348, 351, 353, 355, 347
See application file for complete search history.

(56) References Cited

U.S. PATENT DOCUMENTS

| 5,955,046 | A | * | 9/1999 | Okimura et al. .......... 423/239.1 |
| 5,993,764 | A | | 11/1999 | Tabata et al. |
| 6,089,017 | A | | 7/2000 | Ogawa et al. |
| 6,128,899 | A | | 10/2000 | Oono et al. |
| 6,153,161 | A | | 11/2000 | Fetzer et al. |
| 6,153,162 | A | | 11/2000 | Fetzer et al. |
| 6,182,443 | B1 | | 2/2001 | Jarvis et al. |
| 6,202,407 | B1 | | 3/2001 | Brusasco et al. |
| 6,232,253 | B1 | | 5/2001 | Narula et al. |
| 6,258,336 | B1 | | 7/2001 | Breen et al. |
| 6,296,820 | B1 | | 10/2001 | Fröhlich et al. |
| 6,305,160 | B1 | | 10/2001 | Hammerle et al. |
| 6,314,722 | B1 | | 11/2001 | Matros et al. |
| 6,342,191 | B1 | * | 1/2002 | Kepner et al. ............... 423/210 |
| 6,703,343 | B2 | | 3/2004 | Park |
| 6,706,660 | B2 | | 3/2004 | Park |
| 2003/0118960 | A1 | | 6/2003 | Balmer-Millar et al. |
| 2003/0134745 | A1 | | 7/2003 | Park |

FOREIGN PATENT DOCUMENTS

| EP | 0 148 261 | 5/1987 |
|---|---|---|
| EP | 0498325 | 8/1992 |
| EP | 0577438 | 1/1994 |
| EP | 0 687 499 | 6/1995 |
| EP | 0 537 968 | 1/1996 |
| EP | 0 697 240 | 2/1996 |
| EP | 0 732 140 | 9/1996 |
| EP | 0 593 790 | 12/1996 |
| EP | 0 852 966 | 7/1998 |
| EP | 0 656 809 | 4/1999 |
| EP | 0935055 | 8/1999 |
| EP | 1 027 919 | 8/2000 |
| EP | 1 036 591 | 9/2000 |
| EP | 1 054 139 | 11/2000 |
| EP | 1 094 206 A2 | 4/2001 |
| EP | 1205235 A1 | 8/2001 |
| EP | 1 054 722 | 12/2001 |
| EP | 1 094 206 A3 | 3/2003 |
| EP | 0 963 782 | 5/2003 |
| EP | 1 0766 454 | 6/2003 |
| JP | 51133191 | 11/1976 |
| JP | 51141788 | 12/1976 |
| JP | 52024996 | 2/1977 |
| JP | 52037590 | 3/1977 |
| JP | 52042489 | 4/1977 |
| JP | 52148495 | 12/1977 |
| JP | 60025542 | 2/1985 |
| JP | 01127689 | 5/1989 |
| JP | 03089699 | 4/1991 |
| JP | 04250522 | 9/1992 |
| JP | 5-76762 | 3/1993 |
| JP | 5-195757 | 8/1993 |
| JP | 5-220349 | 8/1993 |
| JP | 6-71140 | 3/1994 |
| JP | 06198172 | 7/1994 |
| JP | 07068180 | 3/1995 |
| JP | 07086259 | 3/1995 |

(Continued)

OTHER PUBLICATIONS

M. Haneda, et al, Promotional Effect of $H_2O$ on the Activity of $In_2O_3$-Doped $Ga_2O_3$—$Al_2O_3$ for the Selective Reduction of Nitrogen Monoxide, Catalyst Letters 55 (1998), pp. 47-55.
The International Search Report Dated Apr. 20, 2005.

*Primary Examiner*—Edward M. Johnson
(74) *Attorney, Agent, or Firm*—Fletcher Yoder

(57) ABSTRACT

A catalyst system comprising a catalyst and a reductant is disclosed. The catalyst comprises a metal oxide catalyst support, a catalytic metal oxide, and a promoting metal. The catalytic metal oxide comprises gallium oxide, indium oxide or a combination of the two. The promoting metal comprises at least one of silver, cobalt, vanadium, molybdenum, tungsten, zinc, tin and bismuth. The catalyst comprises about 5 to about 31 mol % catalytic metal oxide and about 0.5 to about 9 mol % promoting metal. The reductant comprises a fluid hydrocarbon having at least 4 carbon atoms. Also disclosed is a process for reducing $NO_x$ to $N_2$ using the disclosed catalyst system by mixing $NO_x$ with a reductant and passing the mixture through a catalyst of the disclosed catalyst system.

17 Claims, 1 Drawing Sheet

FOREIGN PATENT DOCUMENTS

| | | |
|---|---|---|
| JP | 07150245 | 6/1995 |
| JP | 07213902 | 8/1995 |
| JP | 07237385 | 9/1995 |
| JP | 07284664 | 10/1995 |
| JP | 9-99241 | 4/1997 |
| JP | 10054138 | 2/1998 |
| JP | 10151347 | 6/1998 |
| JP | 10192060 | 7/1998 |
| JP | 10-244155 | 9/1998 |
| JP | 10258232 | 9/1998 |
| JP | 10296080 | 11/1998 |
| JP | 10314593 | 12/1998 |
| JP | 10317946 | 12/1998 |
| JP | 11019513 | 1/1999 |
| JP | 11128753 | 5/1999 |
| JP | 11147041 | 6/1999 |
| JP | 11169711 | 6/1999 |
| JP | 11173181 | 6/1999 |
| JP | 11221467 | 8/1999 |
| JP | 11221468 | 8/1999 |
| JP | 11221470 | 8/1999 |
| JP | 11276899 | 10/1999 |
| JP | 11285624 | 10/1999 |
| JP | 11288227 | 10/1999 |
| JP | 11333256 | 12/1999 |
| JP | 2000002111 | 1/2000 |
| JP | 2000008909 | 1/2000 |
| JP | 2000010358 | 1/2000 |
| JP | 2000054825 | 2/2000 |
| JP | 2000070722 | 3/2000 |
| JP | 2000080918 | 3/2000 |
| JP | 2000093794 | 4/2000 |
| JP | 2000117058 | 4/2000 |
| JP | 2000135419 | 5/2000 |
| JP | 2000140638 | 5/2000 |
| JP | 2000192853 | 7/2000 |
| JP | 2000202243 | 7/2000 |
| JP | 2000225323 | 8/2000 |
| JP | 2000230414 | 8/2000 |
| JP | 2000248923 | 9/2000 |
| JP | 2000257420 | 9/2000 |
| JP | 2000271428 | 10/2000 |
| JP | 2000282851 | 10/2000 |
| JP | 2000282852 | 10/2000 |
| JP | 2000297627 | 10/2000 |
| JP | 2000300995 | 10/2000 |
| JP | 2000308829 | 11/2000 |
| JP | 2000325791 | 11/2000 |
| JP | 2000337130 | 12/2000 |
| JP | 2000342966 | 12/2000 |
| JP | 2001009279 | 1/2001 |
| JP | 2001029793 | 2/2001 |
| JP | 2001032745 | 2/2001 |
| JP | 2001041025 | 2/2001 |
| JP | 2001050034 | 2/2001 |
| JP | 2001050036 | 2/2001 |
| JP | 2001070755 | 3/2001 |
| JP | 2001070797 | 3/2001 |
| JP | 2001132440 | 5/2001 |
| JP | 2001145820 | 5/2001 |
| JP | 2001149757 | 6/2001 |
| JP | 2001198461 | 7/2001 |
| JP | 2001198462 | 7/2001 |
| JP | 2001227333 | 8/2001 |
| JP | 2001246259 | 9/2001 |
| JP | 2001252563 | 9/2001 |
| JP | 2001259422 | 9/2001 |
| WO | WO 86/01741 | 3/1986 |
| WO | WO 94/04258 | 3/1994 |
| WO | WO 96/01689 | 1/1996 |
| WO | WO 96/29140 | 9/1996 |
| WO | WO 98/56492 | 12/1998 |
| WO | WO 99/39809 | 8/1999 |
| WO | WO00/59600 | 10/2000 |
| WO | WO 00/59600 | 10/2000 |
| WO | WO 01/19499 | 3/2001 |
| WO | WO 01/56685 | 8/2001 |
| WO | WO 01/63104 | 8/2001 |
| WO | WO 02/31325 | 4/2002 |

\* cited by examiner

CATALYST SYSTEM FOR THE REDUCTION OF $NO_x$

FIELD OF THE INVENTION

This invention relates generally to a catalyst system and method for the reduction of nitrogen oxide emissions and more particularly to a catalyst system that includes a multi-component catalyst and reductant.

BACKGROUND OF THE INVENTION

Solutions have long been sought to reduce the deleterious effects of air pollution caused by byproducts resulting from the high-temperature imperfect combustion of organic materials. When combustion occurs in the presence of excess air and at high temperatures, harmful byproducts, such as nitrogen oxides ($NO_x$), are created. $NO_x$ plays a major role in the formation of ground-level ozone that is associated with asthma and other respiratory ailments. $NO_x$ also contributes to soot, linked to a number of serious health effects, as well as acid rain and the deterioration of coastal estuaries. As a result, $NO_x$ emissions are subject to many regulatory provisions limiting the amount of $NO_x$ that may be present in effluent gas vented into the surrounding environment.

One known solution involves the use of selective catalytic reduction (SCR) to reduce $NO_x$ to nitrogen gas ($N_2$) using ammonia ($NH_3$) as a reductant. However, as ammonia's own hazardous consequences become better known, the use of $NH_3$ in a SCR system presents additional environmental and other problems that must also be addressed.

As regulatory agencies continue to drive limits on $NO_x$ emission lower, other regulations are also driving down the permissible levels of $NH_3$ that may be emitted into the atmosphere.

BRIEF SUMMARY OF THE INVENTION

Accordingly, it may be desirable to provide a catalyst system for the selective catalytic reduction of $NO_x$ that reduces or even avoids the use ammonia as a reductant but that still results in good conversion of $NO_x$ to $N_2$.

In one exemplary embodiment of the invention, a catalyst system comprising a catalyst and a reductant is disclosed. The catalyst comprises a metal oxide catalyst support, a catalytic metal oxide comprising at least one of gallium oxide and indium oxide, and a promoting metal comprising at least one of silver, cobalt, vanadium, molybdenum, tungsten, zinc, tin and bismuth. The catalyst comprises about 5 to about 31 mol % catalytic metal oxide and about 0.5 to about 9 mol % promoting metal. The reductant comprises a fluid hydrocarbon having at least 4 carbon atoms.

Also disclosed is a process for reducing $NO_x$ from an effluent gas. The method comprises mixing a $NO_x$ containing effluent gas with a fluid hydrocarbon reductant comprising at least 4 carbon atoms to create a gas mixture and passing the gas mixture through a catalyst. The catalyst through which the gas mixture is passed comprises a metal oxide catalyst support, a catalytic metal oxide comprising at least one of gallium oxide and indium oxide, and a promoting metal comprising at least one of silver, cobalt, vanadium, molybdenum, tungsten, zinc, tin and bismuth, wherein the catalyst comprises about 5 to about 31 mol % catalytic metal oxide and about 0.5 to about 9 mol % promoting metal.

Additional aspects, features and advantages of the present invention will be more apparent when considered in light of the following detailed description of exemplary embodiments of the invention.

DETAILED DESCRIPTION OF EXEMPLARY EMBODIMENTS

Figure 1:
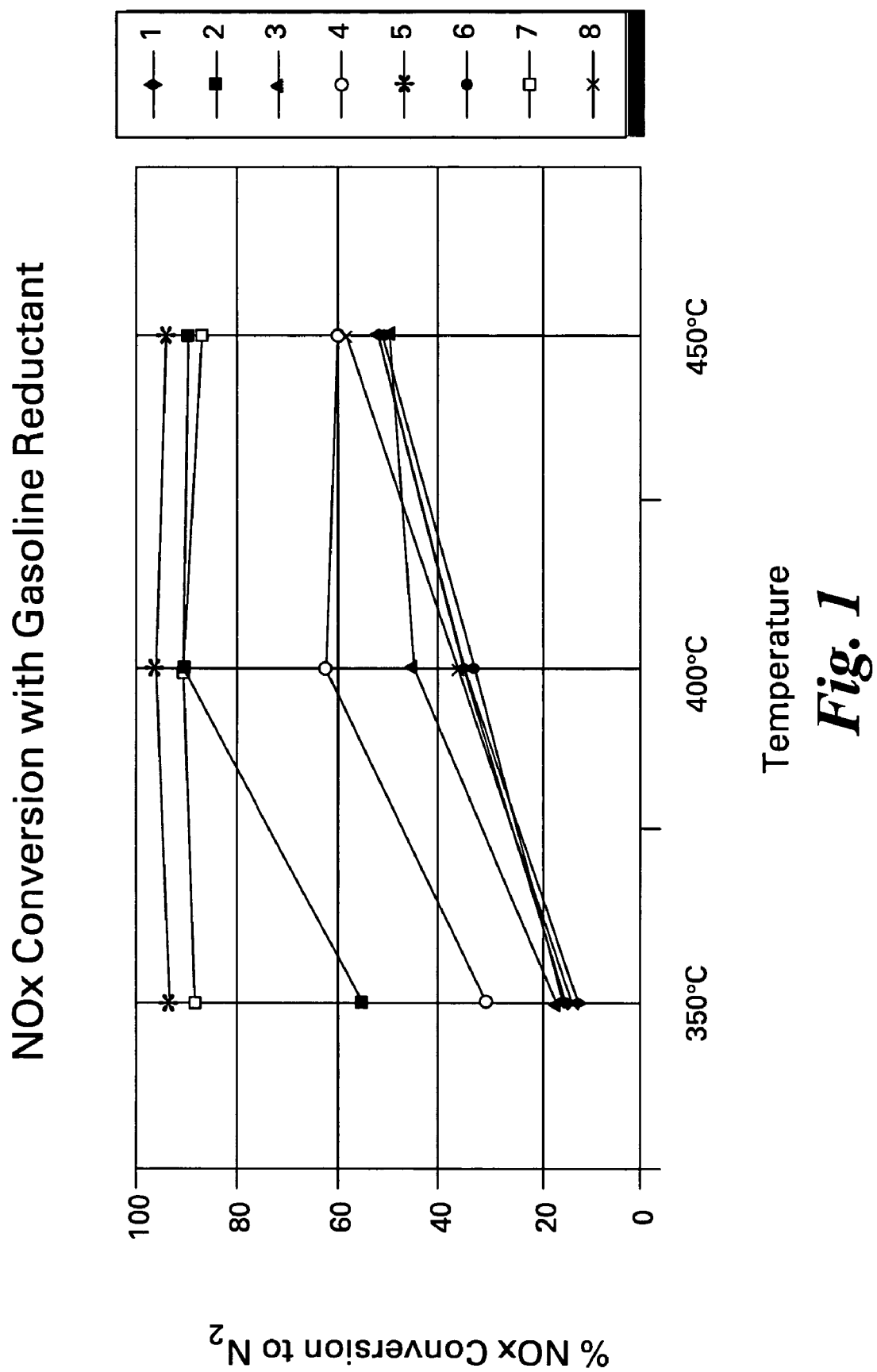
FIG. 1 is a graphical representation of $NO_x$ reduction as a function of temperature of various exemplary embodiments of the invention.

A catalyst system for the selective reduction of $NO_x$ comprises a catalyst and a reductant according to exemplary embodiments of the invention. The catalyst comprises a metal oxide catalyst support, a catalytic metal oxide, and a promoting metal. The reductant comprises a fluid hydrocarbon having at least 4 carbon atoms.

The metal oxide catalyst support may comprise alumina, titania, zirconia, ceria or any mixture of these materials. Typically, the metal oxide catalyst support comprises alumina. The metal oxide catalyst support may be made by any method known to those of skill in the art, such as the sol-gel technique for example.

The catalyst also comprises a catalytic metal oxide. The catalytic metal oxide comprises gallium oxide, indium oxide, or a mixture of the two. The catalyst comprises about 5 to about 31 mol % catalytic metal oxide. When the catalytic metal oxide is a mixture of gallium oxide and indium oxide, the gallium oxide may typically be present in higher amounts than the indium. In certain embodiments of the invention, the catalyst may comprise 20-30 mol % gallium, while the catalyst may comprise about 1 to about 4 mol % indium.

The catalyst also comprises a promoting metal. The promoting metal may comprise any one of cobalt, silver, vanadium, molybdenum, tungsten, zinc, tin, or bismuth. Additionally, the promoting metal may also be a combination of more than one of these metals. The catalyst typically comprises about 0.5 to about 9 mol % of the promoting metal, more typically less than about 6 mol %. When the promoting metal comprises silver, the catalyst preferably comprises about 2 mol % silver. It should be appreciated that the term "promoting metal" is meant to encompass elemental metals, metal oxides or salts of the promoting metal, such as CoO for example.

The catalysts may be produced by an incipient wetness technique, involving the application of aqueous precursor solutions of catalytic material added to the metal oxide catalyst support. The metal oxide particles for the catalyst support may first be calcined at about 725° C. The particles are sifted to collect and use those which are from about 450 to about 1000 micrometers in diameter. Based on the surface area of the metal oxide particles, the desired loading of the catalyst may then be calculated. As will be appreciated by those of ordinary skill in the art, the surface area and porosity may be up to about 20-30% lower in the final catalyst product, as a result of catalyst loading.

Next, aqueous precursor solutions of the catalytic metal oxide and promoting metal(s) may be prepared. The solutions are typically made by mixing water with metal salts, such as metal nitrates for example, in an amount to create a solution of appropriate molarity, based on the desired catalyst composition. The desired volume of the precursor solutions is added to coat the metal oxide catalyst support and create a catalyst with the desired final catalyst loading. Once the metal salt solution(s) have been added to the metal oxide catalyst support, the catalyst may be left to stand for about 6 to 10 hours. The catalyst is then dried for about 4 to 5 hours at about 80° C. under a vacuum while a nitrogen stream is passed over the mixture. Finally, the catalyst is calcined at about 650° C. for about 6 hours to create the final catalyst product.

Catalysts according to exemplary embodiments of the present invention may be created using either a manual or automated process. Typically, manual preparation is used for the preparation of catalysts of a larger mass, such as about 1 to about 20 g for example. Automatic preparation is typically used when the catalysts are of a smaller mass, such as about 50 to about 100 mg, for example. Generally, manual and automatic preparation of the catalyst is identical with the exception that automatic preparation involves automated measuring and dispensing of the aqueous precursor solutions to the metal oxide catalyst support.

The reductant for use in the catalyst system of exemplary embodiments of the present invention comprises hydrocarbons having at least 4 carbon atoms. The hydrocarbons are fluid, either as a liquid or gas, such that they may flow through the catalyst when introduced into an effluent gas stream for use in a catalyst system for the reduction of $NO_x$. Typically, hydrocarbons of less than about 16 carbon atoms will be fluid, although hydrocarbons with higher numbers of carbon atoms may also be fluid, for example, depending on the chemical structure and temperature of the gas stream. The hydrocarbons may be any type of hydrocarbon, including, for example, alkanes and alkenes whether straight chain, branched or cyclical.

The reductant may comprise hydrocarbons that are all of the same type or it may contain a mixture of different hydrocarbons. Further, the mixture may be a mixture of hydrocarbons all having the same number of carbon atoms such as octane, octene and 1,3-dimethyl-cyclohexane, for example. Likewise, the mixture may be a mixture of hydrocarbons having different numbers of carbon atoms such as hexane and butane, for example. One particularly suitable mixture of hydrocarbons for use as a reductant in the catalyst system of various embodiments of the invention is gasoline. As will be appreciated by those of skill in the art, gasoline is typically a mixture of linear and branched hydrocarbons, with a majority of the hydrocarbons having between about 5 and about 12 carbon atoms.

The catalyst system may be used in conjunction with any system in which it may be desirable to reduce $NO_x$ emissions, such as gas turbine and transportation exhaust systems, for example. The catalyst is typically placed at a location within an exhaust system where it will be exposed to effluent gas containing $NO_x$. The catalyst may be arranged as a packed or fluidized bed reactor, coated on a monolithic or membrane structure, or arranged in any other manner within the exhaust system such that the catalyst is in contact with the effluent gas.

As will be appreciated by those ordinarily skilled in the art, although catalytic reactions are generally complex and involve many steps, the overall basic selective catalytic reduction reaction process for the reduction of $NO_x$ occurs as follows:

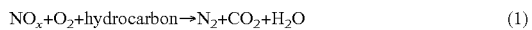
(1)

The effluent gas stream usually contains air, water, CO, $CO_2$, $NO_x$, and may also contain other impurities, such as $SO_2$ for example. Additionally, uncombusted or incompletely combusted fuel may also be present in the effluent gas stream. The hydrocarbon reductant is fed into the effluent gas stream and through the catalyst. Sufficient oxygen to support the $NO_x$ reduction reaction may already be present in the effluent gas stream, but if not, additional oxygen may also be introduced into the effluent gas stream. Oxygen may typically be present in the effluent gas stream containing the reductant at greater than about 5% by volume, more typically about 10 to about 20% by volume.

One advantage of embodiments of the present invention is that the reduction reaction may take place in "lean" conditions. That is, the amount of reductant added to the effluent gas to reduce the $NO_x$ is generally low. The molar ratio of reductant to $NO_x$ is typically from about 0.25:1 to about 3:1. More specifically, the ratio is typically such that the ratio of carbon atoms in the reductant is about 1 to about 24 moles per one mole of $NO_x$. Reducing the amount of reductant to convert the $NO_x$ to nitrogen may provide for a more efficient process that has decreased raw material costs.

The reduction reaction may take place over a range of temperatures. Typically, the temperature may range from about 300 to about 600° C., more typically about 350 to about 450° C.

Exemplary embodiments of the catalyst system of the invention may also advantageously be used in wet conditions. $NO_x$ reduction accomplished using exemplary embodiments of the present invention may be effective in effluent gas streams having up to about 1.0% water or more by volume. Increasing the percentage of water up to about 7 to about 9% by volume may also result in an increase in catalyst activity. After about 7-9% water by volume, catalyst activity may stabilize and no longer increase with increasing water amounts, although the catalyst system may continue to be effective.

EXAMPLES

Catalysts in accordance with exemplary embodiments of the invention were prepared and used in combination with reductants also in accordance with exemplary embodiments of the invention. The conversion of the $NO_x$ was analyzed over a variety of experimental conditions, including varying catalyst compositions, reductants, reaction temperatures, compositions of reactant streams and reductant to $NO_x$ ratios. The following examples are for the purpose of illustrating exemplary embodiments of the invention and are not intended to be limiting.

Catalyst samples were prepared having an alumina catalyst support. The type and amounts of metal oxide and promoting metal in the samples were varied to produce different catalysts in accordance with exemplary embodiments of the invention.

Table 1 shows the compositions of the catalyst samples prepared, with compositions expressed in mole percent of each promoting metal and/or catalytic metal present in the catalyst. The balance of the composition is alumina from the alumina catalyst support. Mole percent was determined for each component by dividing the number of moles of that component by the total number of moles of the metal components in the catalyst, including the metal components of the catalyst support. Catalyst compositions numbered 1-4, 9 and 12 were prepared for comparative purposes.

TABLE 1

| | Catalyst: | | | | | | | | | | | | | | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 |
| % Ag | 0 | 2 | 0 | 0 | 2 | 0 | 2 | 0 | 5 | 0 | 0 | 9 | 4 | 9 | 1 | 2 | 3 | 4 | 6 |
| % Co | 0 | 0 | 0 | 0 | 0 | 2 | 0 | 3 | 0 | 4 | 4 | 0 | 0 | 0 | 0 | 0 | 0 | 0 | 0 |
| % In | 0 | 0 | 4 | 2 | 0 | 0 | 2 | 3 | 0 | 0 | 4 | 0 | 0 | 0 | 6 | 2 | 3 | 4 | 1 |
| % Ga | 29 | 0 | 0 | 27 | 27 | 27 | 25 | 22 | 0 | 27 | 20 | 0 | 25 | 20 | 22 | 25 | 22 | 21 | 22 |

Each catalyst sample was prepared with alumina as the metal oxide catalyst support. Starting materials for the catalyst included alumina catalyst support commercially available from Saint-Gobain NorPro of Stow, Ohio. The alumina catalyst support had a purity of greater than 99% and was then calcined and sieved as previously described to create the catalyst support having a particle size diameter of about 450 to about 1000 micrometers. Prior to loading, the catalyst support had a surface area of about 240 $m^2/g$ and a pore volume of 0.796 mL/g.

Gallium was used as the metal for the catalytic metal oxide added to the alumina, which was weighed to determine the total pore volume. The gallium oxide was added to wet the alumina support and was made from a solution of gallium nitrate having the formula $Ga(NO_3)_3 \cdot 6H_2O$. The solution was made by combining water with gallium nitrate having a purity of 99.999% (metals basis) obtained from Alfa-Aesar of Ward Hill, Mass. For the promoting metal, such as silver, for example, an aqueous solution of the nitrate salt of the desired metal(s) also having a purity of 99.999% (metals basis) and obtained from Alfa-Aesar was added to the alumina support. The catalysts were left to stand for 6 to 10 hours and were then dried under a dynamic vacuum with a nitrogen influx for 4 to 5 hours at 80° C. Finally, the dried catalyst was heat treated. The heat profile for this treatment began with an increase from 25° C. at 1.4° C./min to 110° C. The catalyst was held at 110° C. for 1.5 hours, after which the temperature was ramped at 5° C./min until 650° C. The catalyst was then held 6 hours at this temperature and then allowed to cool over a period of about 4 to 6 hours.

Catalysts were tested in a 32-tube high-throughput heterogeneous catalyst-screening micro-reactor. The reactor was a heated, common headspace gas distribution manifold that distributed a reactant stream equally via matched capillaries to parallel reactor tubes. The manifold had heated capabilities, allowing pre-heating of the reactant stream and vaporization of liquid reactants prior to distribution. The entire heated manifold assembly was mounted on a vertical translation stage, raised and lowered via pneumatic pressure. Reactor tubes were inserted in a gold-coated 10 cm thick insulated copper reactor block, which was electrically heated to vary temperature between 200° C. to 800° C.

Chemically inert KALREZ o-rings available from DuPont of Wilmington, Del. served as viscoelastic end-seals on either end of each reactor tube. Reaction tubes were made of INCONEL 600 tubing with 0.635 cm outside diameter, 0.457 cm internal diameter, available from Inco Alloys/Special Metals of Saddle Brook, N.J. The tubes were free to slide vertically through the gold-coated copper heating block. Each tube contained a quartz wool frit, on which the catalyst samples of about 0.050 g were placed in the center of each of the tubes through which a reactant stream of a blended gas mixture including $NO_x$ and reductant simulating an effluent gas stream was passed. A single bypass tube was used to ensure equal flow through each of the 32 testing tubes. The fittings were connected to a distribution manifold for delivery of the blended gas mixture. The components of the blended gas mixture were fed to a common mixing manifold, using electronic mass flow controllers, and then routed to a distribution manifold. The pressure in the distribution manifold was maintained at about 275.8 kPa (about 40 psi). Reactor temperature and flow control were fully automated.

Once loaded in the tubes, the catalysts were heat-treated under airflow and then reacted with the blended gas mixture. The reactor effluent was sent to heated sampling valves that selected tubes in series and fed the continuous stream to an analytical device. Any stream that was not routed to the analytical device was routed to a common vent.

The switching valves were computer controlled and actuated in a pre-determined time-based sequence. The gas analyzer was connected to a computer-based data-logging system. Data corresponding to sample-tube effluent composition was time-stamped and stored. Data from the bypass tube was also stored as a reference to the inlet composition of the catalyst sample tubes. This permitted the combination of data to determine activity and selectivity of each catalyst sample.

For $NO_x$ reduction testing, the reactant stream of the blended gas mixture contained reductant, about 200 ppm $NO_x$, 12% by volume oxygen, 7% by volume water and the balance nitrogen. The type and amount of reductant in the stream varied depending on the experiments being conducted. The flow rate of the blended gas mixture through each of the tubes was 33 standard cubic centimeters per minute (sccm) per tube.

A first experiment was conducted in which various catalyst samples were prepared and tested using the described testing procedure. In this experiment, reductants including propane, propene, pentane, hexane and octane were analyzed at 400 and 450° C. The results in Table 2 show the percentage of $NO_x$ converted at each temperature for each of the catalyst systems. The catalyst numbers in Table 2 correspond to the catalyst compositions identified in Table 1. The ratio shown in Table 2 in parentheticals is the molar ratio of reductant to $NO_x$ used. Although the molar ratio of reductant to $NO_x$ varied with the reductant used, the molar ratio of carbon:$NO_x$ was generally equal at about 9:1 (8:1 for octane) for each of the experimental systems.

TABLE 2

| | Reductant (Reductant:$NO_x$ molar ratio) | | | | | | | | | |
|---|---|---|---|---|---|---|---|---|---|---|
| | Propane (3:1) | | Propene (3:1) | | Pentane (1.8:1) | | Hexane (1.5:1) | | Octane (1:1) | |
| Catalyst | 400 C. | 450 C. | 400 C. | 450 C. | 400 C. | 450 C. | 400 C. | 450 C. | 400 C. | 450 C. |
| 1 | 0 | 6 | — | — | 44 | 57 | 65 | 48 | 40 | 18 |
| 3 | 0 | 4 | 48 | 56 | 67 | 22 | 67 | 23 | 39 | 14 |
| 4 | 0 | 12 | 65 | 67 | 79 | 46 | 70 | 46 | 46 | 22 |
| 5 | 30 | 73 | 36 | 78 | 97 | 78 | 97 | 79 | 75 | 23 |
| 7 | 17 | 72 | 36 | 80 | 96 | 79 | 97 | 81 | 73 | 22 |
| 9 | 7 | 29 | 32 | 59 | 91 | 21 | 50 | 14 | 30 | 9 |
| 10 | 0 | 10 | 19 | 47 | 71 | 31 | 75 | 57 | 46 | 20 |
| 11 | 0 | 10 | 29 | 55 | 79 | 24 | 96 | 22 | 47 | 15 |

As shown in Table 2, better results were generally obtained using pentane, hexane and octane as compared to propane and propene. In particular, catalysts 5 and 7 having a combination of gallium oxide as a catalytic metal oxide and silver as a promoting metal showed particularly good results using reductants other than propane and propene.

In a second experiment, catalyst samples were again studied using different reductants. However, in this experiment, each hydrocarbon reductant was a different type of eight carbon compound. This experiment was conducted at 400 and 450° C., and all reductants were present in a molar ratio of 3:1 with respect to $NO_x$.

TABLE 3

| | Reductant | | | | | | | | | |
|---|---|---|---|---|---|---|---|---|---|---|
| | 1-Octene | | Octane | | 2,2,4-Trimethyl Pentane | | Cyclooctane | | 1,3-dimethyl-cyclohexane | |
| Catalyst | 400 C. | 450 C. | 400 C. | 450 C. | 400 C. | 450 C. | 400 C. | 450 C. | 400 C. | 450 C. |
| 1 | 76 | 70 | 76 | 69 | 59 | 57 | 18 | 64 | 62 | 46 |
| 4 | 75 | 62 | 75 | 62 | 61 | 45 | 58 | 70 | 65 | 45 |
| 5 | 95 | 95 | 96 | 95 | 90 | 94 | 94 | 96 | 82 | 92 |
| 6 | 76 | 67 | 77 | 68 | 60 | 48 | 51 | 68 | 64 | 44 |
| 8 | 89 | 81 | 89 | 81 | 76 | 65 | 23 | 69 | 80 | 65 |

While all of the catalyst samples showed good or better performance compared with comparative samples 1 & 4, catalyst 5 having 2 mol % silver and 27 mol % gallium oxide showed particularly good results with each of the eight carbon reductants.

A third experiment used gasoline as a reductant comparing conversion of $NO_x$ as a function of reaction temperature. The gasoline used for the experiment had an octane number of 87. The reaction conditions were as described above using 600 ppm of reductant. Results for the third experiment are summarized in Table 4 and are shown graphically in FIG. 1. Again, catalyst numbers correspond to the catalyst compositions identified in Table 1.

TABLE 4

| | Reaction Temperature | | |
|---|---|---|---|
| Catalyst | 350 C. | 400 C. | 450 C. |
| 1 | 13 | 34 | 50 |
| 2 | 55 | 90 | 89 |
| 3 | 17 | 44 | 48 |
| 4 | 31 | 62 | 60 |
| 5 | 93 | 96 | 93 |
| 6 | 15 | 32 | 49 |
| 7 | 88 | 90 | 86 |
| 8 | 14 | 35 | 57 |

As demonstrated, catalysts 5 and 7, both of which contained 2 mol % silver were particularly effective, although all compositions resulted in some conversion of $NO_x$.

A fourth experiment further explored catalysts having various amounts of silver as a promoting metal in combination with an alumina catalyst support and a catalytic metal oxide. Conditions for Experiment 4 were the same as those described. Reductants used for this experiment were octane and gasoline (octane number 87). The octane was fed at an octane to $NO_x$ molar ratio of 1:1 while gasoline was fed at a gasoline to $NO_x$ molar ratio of 3:1. Results for the fourth experiment, which was run at 400° C. and 450° C., are shown below in Table 5.

TABLE 5

| | Reductant (Reductant:NO$_x$ molar ratio) | | | |
|---|---|---|---|---|
| | Octane (1:1) | | Gasoline (3:1) | |
| Catalyst | 400 C. | 450 C. | 400 C. | 450 C. |
| 2 | 63 | 35 | 90 | 89 |
| 9 | 31 | 10 | 84 | 72 |
| 12 | 4 | 1 | 12 | 3 |
| 5 | 75 | 23 | 96 | 93 |
| 13 | 20 | 15 | 77 | 62 |
| 14 | 4 | 3 | 12 | 2 |
| 15 | 70 | 23 | 75 | 42 |
| 16 | 89 | 44 | 90 | 86 |
| 17 | 39 | 25 | 89 | 59 |
| 18 | 15 | 17 | 43 | 35 |
| 19 | 5 | 17 | 21 | 27 |

The results of Experiment 4 indicate that the highest levels of NO$_x$ conversion are achieved when silver is present at about 2 mol %, as demonstrated by catalysts 5 and 16. The results also surprisingly show that increasing the silver content beyond this level actually results in a decrease of NO$_x$ conversion. Additionally, as shown in comparison of catalyst 2 versus catalyst 5, a catalyst having 2 mol % silver and 27 mol % gallium oxide results in higher conversion levels than 2 mol % silver alone at the same conditions.

Additional catalysts with an alumina catalyst support and catalytic gallium oxide were prepared with tungsten and molybdenum as promoting metals, as shown in the table of compositions shown in Table 6. Some of these preparations also included indium as a promoting metal. A comparative sample, catalyst 20, of just gallium oxide and indium was also prepared.

TABLE 6

| | Catalyst: | | | | |
|---|---|---|---|---|---|
| | 20 | 21 | 22 | 23 | 24 |
| % W | 0 | 2 | 0 | 9 | 3 |
| % Mo | 0 | 4 | 4 | 0 | 0 |
| % In | 2 | 0 | 4 | 0 | 3 |
| % Ga | 25 | 25 | 20 | 20 | 22 |

Experiments with catalyst systems comprising these catalysts were conducted in a similar manner as the previous experiments using propene, gasoline (octane number 87) and octane as reductants, the results of which are demonstrated in Table 7, where the catalyst numbers match the catalyst compositions described in Tables 1 and 6.

TABLE 7

| | Reductant (C1:NO$_x$ molar ratio) | | | |
|---|---|---|---|---|
| | Propene (6:1) | | Gasoline (3:1) | Octane (6:1) |
| Catalyst | 400 C. | 450 C. | 450 C. | 400 C. |
| 1 | 15 | 36 | 58 | 39 |
| 20 | 29 | 53 | 61 | 43 |
| 21 | 18 | 45 | 63 | 51 |
| 22 | 10 | 25 | 46 | 33 |
| 23 | 10 | 17 | 36 | 28 |
| 24 | 34 | 57 | 64 | 44 |

Although the catalyst systems in accordance with exemplary embodiments of the invention did not outperform the comparative results in every case, they were comparable in performance and were successful in reducing some NO$_x$ in each case.

While the foregoing specification illustrates and describes exemplary embodiments of this invention, it is to be understood that the invention is not limited to the construction disclosed herein. The invention can be embodied in other specific forms without departing from the spirit or essential attributes. Accordingly, reference should be made to the following claims, rather than to the foregoing specification, as indicating the scope of the invention.

We claim:

1. A catalyst system for the reduction of NOx in effluent gases from combustion sources comprising:
   a catalyst comprising
   a metal oxide catalyst support,
   a catalytic metal oxide comprising at least one of gallium oxide and indium oxide, and
   a promoting metal comprising at least one of silver, cobalt, vanadium, molybdenum, tungsten, zinc, tin and bismuth,
   wherein the catalyst comprises about 5 to about 31 mol % catalytic metal oxide and about 0.5 to about 9 mol % promoting metal; and
   a reductant, comprising a fluid hydrocarbon having at least 4 carbon atoms.

2. The catalyst system of claim 1, wherein the metal oxide catalyst support comprises at least one of alumina, titania, zirconia, and ceria.

3. The catalyst system of claim 1 wherein the promoting metal further comprises indium.

4. The catalyst system of claim 3 wherein the catalyst comprises about 1 to about 5 mol % indium.

5. The catalyst system of claim 1, wherein the catalyst comprises from about 25 to about 31 mol % gallium oxide.

6. The catalyst system of claim 1, wherein the promoting metal comprises silver.

7. The catalyst system of claim 6, wherein the catalyst comprises from about 1 to about 4 mol % silver.

8. The catalyst system of claim 1, wherein the promoting metal comprises cobalt.

9. The catalyst system of claim 8, wherein the catalyst comprises from about 1 to about 4 mol % cobalt.

10. The catalyst system of claim 1, wherein the catalyst comprises from about 1 to about 5 mol % tungsten.

11. The catalyst system of claim 1, wherein the catalyst comprises from about 1 to about 5 mol % molybdenum.

12. The catalyst system of claim 1, wherein the catalyst comprises about 20 mol % to about 30 mol % gallium oxide and about 1 mol % to about 4 mol % indium oxide.

13. The catalyst system of claim 1, wherein the reductant is gasoline.

14. The catalyst system of claim 1, wherein the reductant comprises a hydrocarbon having eight carbon atoms.

15. A catalyst system for the reduction of NOx in effluent gases from combustion sources comprising:
   a catalyst comprising
   a metal oxide catalyst support, wherein the metal oxide catalyst support comprises alumina,
   a catalytic metal oxide, wherein the catalytic metal oxide is selected from the group consisting of gallium oxide, indium oxide, and combinations thereof, and a promoting metal, wherein the promoting metal is selected from the group consisting of silver, cobalt, vanadium, molybdenum, tungsten, zinc, tin, bismuth, and combinations thereof, wherein the catalyst comprises about 5 to about 31 mol % catalytic metal oxide and about 0.5 to about 9 mol % promoting metal; and a reductant, comprising a fluid hydrocarbon having at least 4 carbon atoms.

16. The catalyst system of claim 1, wherein the reductant is selected from the group consisting of pentane, hexane, octane, 1-octene, trimethyl pentane, cyclooctane and 1,3-dimethyl-cyclohexane.

17. The catalyst system of claim 15, wherein the reductant is selected from the group consisting of pentane, hexane, octane, 1-octene, trimethyl pentane, cyclooctane and 1,3-dimethyl-cyclohexane.

* * * * *